(12) United States Patent
Tristan et al.

(10) Patent No.: US 11,263,541 B2
(45) Date of Patent: Mar. 1, 2022

(54) ENSEMBLED DECISION SYSTEMS USING FEATURE HASHING MODELS

(71) Applicant: Oracle International Corporation, Redwood City, CA (US)

(72) Inventors: Jean-Baptiste Tristan, Lexington, MA (US); Adam Pocock, Burlington, MA (US); Michael Wick, Amherst, MA (US); Guy Steele, Lexington, MA (US)

(73) Assignee: Oracle International Corporation, Redwood City, CA (US)

( * ) Notice: Subject to any disclaimer, the term of this patent is extended or adjusted under 35 U.S.C. 154(b) by 1027 days.

(21) Appl. No.: 15/717,830

(22) Filed: Sep. 27, 2017

(65) Prior Publication Data

US 2019/0095805 A1   Mar. 28, 2019

(51) Int. Cl.
  *G06N 5/04*     (2006.01)
  *G06N 20/00*    (2019.01)
  *G06F 16/901*   (2019.01)

(52) U.S. Cl.
  CPC ......... *G06N 5/045* (2013.01); *G06F 16/9027* (2019.01); *G06N 20/00* (2019.01)

(58) Field of Classification Search
  CPC ........ G06N 5/045; G06N 20/00; G06N 20/20; G06N 5/00; G06N 5/003; G06N 99/00; G06N 5/04; G06F 16/9027; G06F 16/901; G16H 50/20; G16H 50/30; G16H 50/70; G06Q 50/00; G06Q 50/01
  See application file for complete search history.

(56) References Cited

U.S. PATENT DOCUMENTS

| | | | | |
|---|---|---|---|---|
| 9,072,428 | B2* | 7/2015 | Bigio | A61B 5/7267 |
| 10,140,581 | B1* | 11/2018 | Kiss | G06N 5/022 |
| 2006/0129324 | A1* | 6/2006 | Rabinoff | G06F 19/3456 |
| | | | | 702/19 |
| 2014/0047544 | A1* | 2/2014 | Jakobsson | G06F 21/55 |
| | | | | 726/23 |
| 2014/0279738 | A1* | 9/2014 | Mahler | G06N 20/20 |
| | | | | 706/12 |

(Continued)

OTHER PUBLICATIONS

Weinberger at al. "Feature Hashing for Large Scale Multitask Learning", ICML, 2009, pp. 1113-1120.*

(Continued)

*Primary Examiner* — Li Wu Chang
(74) *Attorney, Agent, or Firm* — Robert C. Kowert; Kowert, Hood, Munyon, Rankin & Goetzel, P.C.

(57) ABSTRACT

Systems and methods are disclosed to build and execute a decision system based on multiple machine learned decision models. In embodiments, the decision system performs a hashing technique to reduce relevant features of the input data into a feature vector for each decision model. The feature vector reduces the dimensionality of the feature universe of the input data, and its use allows the decision models to be trained and executed using less computing resources. In embodiments, the decision system implements an ensembled decision model that makes decisions based on a combination function that combines the decision results of the individual models in the ensemble. The decision models employ different hashing techniques to hash the input features differently, so that errors caused by the feature hashing of individual models are reduced in the aggregate.

21 Claims, 12 Drawing Sheets

(56) References Cited

U.S. PATENT DOCUMENTS

2015/0356149 A1* 12/2015 Dagli .................. G06F 16/212
                                                            707/792
2016/0171331 A1*  6/2016 Csefalvay ............ G06K 9/3241
                                                            382/103

OTHER PUBLICATIONS

Polychroniou et al. "Vectorized Bloom Filters for Advanced SIMD Processors", DaMoN, 2014, pp. 4.*

Mahani et al. "SIMD parallel MCMC sampling with applications for big-data Bayesian analytics", CSDA, 2015, pp. 75-99.*

Jae-Hong Eom, et al., "AptaCDSS-E: A classifier ensemble-based clinical decision support system for cardiovascular disease level prediction", ScienceDirect, Expert Systems with Applications, 2007, pp. 1-15.

Wenlin Chen, et al., "Compressing Neural Networks with the Hashing Trick", Proceedings of the 32nd International Conference on Machine Learning, 2015, JMLR: W&CP, vol. 37, pp. 1-10.

Wenlin Chen, et al., "Compressing Convolutional Neural Networks", arXiv:1506.04449, Jun. 14, 2015, pp. 1-9.

Xingquan Zhu, et al., "Active Learning From Stream Data Using Optimal Weight Classifier Ensemble", IEEE Transactions on Systems, Man, and Cybernetics—Part B: Cybernetics, vol. 40, No. 6, Dec. 2010, pp. 1607-1621.

Kilian Weinberger, et al., Feature Hashing for Large Scale Multitask Learning:, http://arxiv.org/abs/0902.2206v5, 2010, pp. 1-10.

Sung-Bae Cho, et al., "Classifying Gene Expression Data of Cancer Using Classifier Ensemble with Mutually Exclusive Features", Proceeding of the IEEE, vol. 90, No. 11, Nov. 2002, pp. 1744-1753.

Qingen Shi, et al., "Hash Kernels for Structured Data", Journal of Machine Learning Research 10, 2009, pp. 2615-2637.

Hsiang-Fu Yu, et al., "Feature Engineering and Classifier Ensemble for KDD Cup 2010", JMLR: Workshop and Conference Proceedings 1; 2010, pp. 1-12.

* cited by examiner

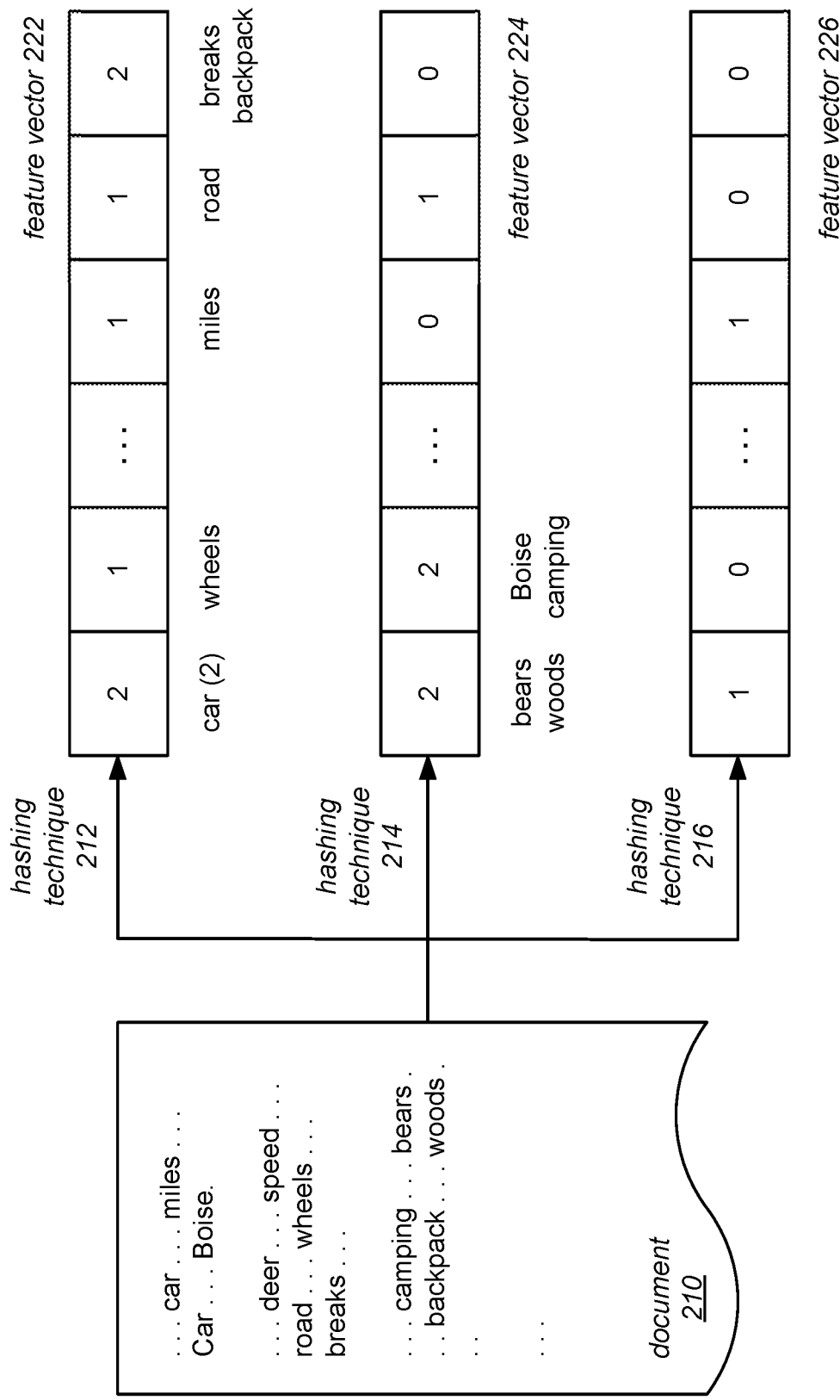

ENSEMBLED DECISION SYSTEMS USING FEATURE HASHING MODELS

BACKGROUND

Field of the Disclosure

This disclosure relates generally to systems and methods for machine learning and machine learning models, and more particularly, to systems and methods for constructing and using data-driven decision-making systems to make decisions from input data having a large feature universe.

Description of the Related Art

Machine learning combines techniques from statistics and artificial intelligence to create algorithms that can learn from empirical data and generalize to solve problems in many different domains, such as document classification. In some cases, machine learning systems may operate over an input domain that has a large universe of features. For example, a document classification system may employ a dictionary of words as distinct features which, in the case of the English language, contains more than 250,000 distinct words. This feature set is increased exponentially if the decision model is based on multi-word phrases.

Large input feature sets pose a difficult challenge for machine learning systems, as they demand higher memory, processing, and storage requirements on the computers hosting the decision system. Often, a single decision by such a system may involve a number of vector operations performed on high-dimension vectors. These vector operations may be computationally expensive. Moreover, the decision model itself is likely to require a large amount of storage space. These problems are worsened during the training stage, when the decision model is repeatedly exercised and modified using large vectors. As a result, the training of these models tends to be both resource-intensive and extremely time-consuming, and often results in systems that exhibit high degrees of error.

SUMMARY

As described herein, a decision system is implemented using a collection of machine learned decision models. The decision models may each perform a hashing technique on the input data to produce a respective feature vector from the input data, reducing the feature space dimensionality of the models. The decision models make respective decisions based on their feature vector. The respective decisions are then combined using a combining function to produce an ultimate decision of the decision system. In some embodiments, the combining function may implement a simple vote of the collection of decision models.

As further described herein, the decision system may be trained using an ensemble learning technique. In some embodiments, the collection of decision models and combining function are initially selected based on a set of performance requirements of the decision system and resources available to train the models. In some embodiments, the training data may be divided among the different models. In other embodiments, the training data may be shared among the models using data subsampling functions. The models are then trained in parallel using machine learning techniques. Because each model employs the hashing technique, they may be trained in a feature space with lower dimensionality, thereby saving processing power and memory usage on the training machine. To reduce any errors that are produced by the hashing technique, the models are combined to form an ensemble, where the decisions of the models are combined to produce the ultimate decision of the system. In some embodiments, the combining function may implement as a simple vote by the individual decision models. In some embodiments, the combining function may comprise another model that is itself trained using machine learning techniques.

As may be understood, such an ensembled decision system and training method provides a number of advantages. First, use of the hashing technique reduces the complexity of the resulting decision system (e.g., decision trees), which reduces computing resource requirements both during training and in the field. Second, the ensemble approach allows system designers to improve the accuracy of the system incrementally, while limiting the complexity of the individual decision models.

Additionally, because the decision-making process in such a system may be largely parallelized, the decisions may be made more quickly. In some embodiments where decision system is "sparse" (i.e., relies on relatively few features in the feature universe), the system may be able to take advantage of fine-grained parallelism, for example, using parallelized computers such as single instruction multiple data (SIMD) computers. For example, the system may employ hash functions that produce feature vectors small enough to fit in the computer's cache, or increase the accuracy of the decisions by leveraging unused SIMD units. In distributed computing environments, the ensembled decision system may be architected to split the work among distinct nodes of the distributed system, while ensuring that each individual decision model on a given node runs as fast as possible.

Depending on the embodiment, optimizations may be made during the training process of such a decision system. As one example, the training process may employ a "bootstrap aggregation" or "bagging" technique, in which the ensemble of decision models are trained using a random subsample of the training data set. In some embodiments, some of the decision models may be trained using only certain subsets of features in the training data. Such techniques are useful to inject some degree of variance into the training of the different decision models, which improves the overall accuracy of the decision system. These and other features and benefits of the inventive systems and methods are discussed in more detail below, in connection with particular embodiments and illustrative figures.

BRIEF DESCRIPTION OF THE DRAWINGS

FIGS. 2A to 2C are diagrams illustrating a document classification performed by an ensembled decision system using feature hashing, according to some embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Figure 1:
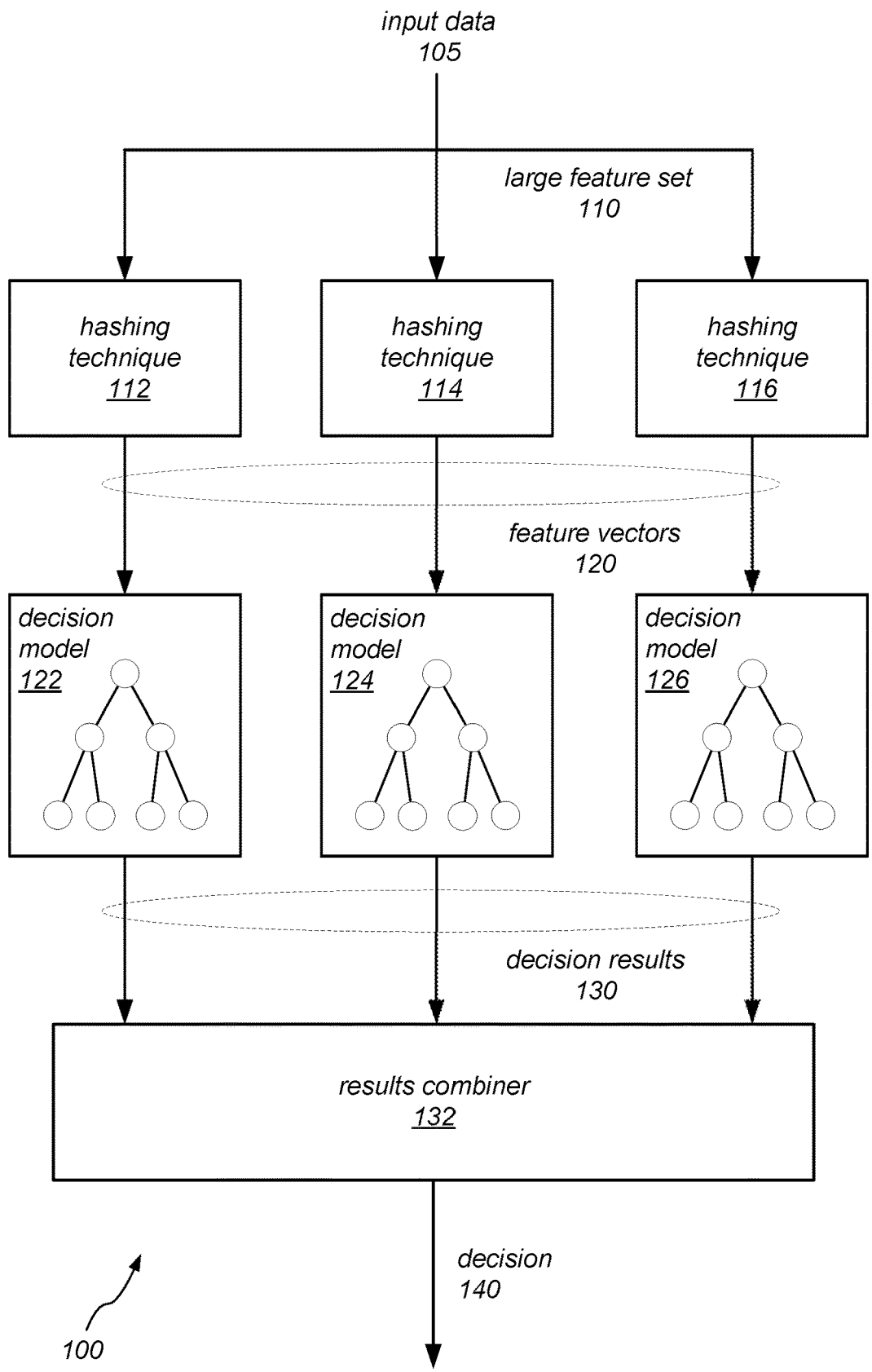
FIG. 1 is a block diagram illustrating an ensembled decision system using multiple decision models employing feature hashing, according to some embodiments disclosed herein.

FIG. 1 is a block diagram illustrating an ensembled decision system using multiple decision models employing feature hashing, according to some embodiments disclosed herein. As illustrated, the decision system 100 receives input data 105 and makes a decision 140 based on the input data. The decision system 100 may be a machine trained system that is built using machine learning techniques. Depending on the embodiment, decision system 100 may be used in a variety of contexts to make decisions based on input data. For example, in some embodiments, the input data 105 may represent a document, and the decision 140 may comprise a classification of the document based on its subject matter. In some embodiments, the input data 105 may be the pixels of an electronic image, and the decision 140 may indicate object that are recognized in the image. As another example, in some embodiments, the input data 105 may represent elements of a patient's medical history and symptoms, and the decision 140 may indicate a diagnosis of the patient's symptoms. The decision system 100 may be a classification system, in which case the decision 140 may indicate a determine category. In other embodiments, the decision system 100 may be a regression system, in which case the decision may span a continuous range (e.g., a probability range). In some embodiments, the decision 140 may indicate a prediction of future conditions based on presently known data, for example, a prediction of the future price of a stock based on the stock's price history. A person or ordinary skill in the art would understand that these embodiments are merely exemplary, and that the decision system 100 may be used in a variety of applications without departing from the spirit of the inventions.

As shown, the input data 105 may include a large feature set 110. That is, the input data may encompass a high-dimensional feature space. For example, in the analysis of a document, each word that appears in the document may represent a feature of the document. Thus, the feature space of the decision system 100 may include all relevant words that may be seen in any document to be analyzed. If the document is limited to words in the English language, the feature space of the decision system 100 may be as big as 250,000 words. If the decision system uses combinations of words as features (e.g., n-grams), the features space may expand even more, in exponential fashion.

To cope with such large feature sets 110, the decision system 100 may employ hashing techniques 112, 114, and 116. In some embodiments, the hashing technique may implement a hashing trick, as described by for example Weinberger et al., *Feature Hashing for Large Scale Multi-task Learning*, Proc. ICML (2009). The hashing trick is a method that is used to make machine learning algorithms faster and use less memory. The hashing trick works by mapping the set of features in the input data into another set by using a hash function. The hashing thus reduces the size of the feature set. In addition, the hashing fixes the number of features that are provided to the decision model, for any input data. Those skill in the art would understand, however, that the hashing trick is simply one example of a hashing technique that may be used to reduce the dimensionality of the input data. In other embodiments, other hashing techniques may be used.

In some embodiments, in a decision system that uses a logistic regression for document classification, the features may be the presence or absence of a word in a document. If the set of possible words that may appear in any document is not known a priori, the decision system may have to implement logistic regression using dynamic data structures that can accommodate previously unseen words. However, by using a hash function h to transform a feature f into h(f) mod D, all possible features will be converted to values less than D. These values may be stored in an array of size D, which may be referred to as feature vectors (e.g., feature vectors 120). Thus, the hashing technique reduces the size of the memory required to keep track of the features. In some embodiments, the size of the feature vector 120 may be set so that all of the vectors needed to carry out a decision-making process fit within a cache of the computer hosting the decision model, so that minimal data need to be loaded from slow data storage during the decision-making process.

In some cases, the hashing technique may cause two words to be hashed to the same value in the feature vector, creating a collision. However, in some embodiments and depending on the size of the feature vector, such collisions may be rare, so that they have little impact on the ultimate performance of the decision system.

In some embodiments, techniques may be used to reduce the impact of feature collisions. For example, in some embodiments, a feature f may be hashed a second time using a second hash function to generate a signed value (e.g., 1 or −1). Each location in the feature vector may specify a frequency that a feature is countered in the input data by adding either 1 or −1 to the existing value at the feature location in the vector. Thus, in most cases, even if two features are hashed to the same location, their combined effect on the feature vector may include sufficient information to differentiate the two features to the decision model. The second hash function thus reduces the impact of collisions in the feature vector.

In some types of decision models, such as sparse logistic regression, the hashing technique does not necessarily reduce the complexity of the model. Rather, the reduced set of features merely provides an engineering improvement in terms of improved data structures. In some embodiments, the decision-making process may be applied directly to the feature vector itself, as opposed to using the vector (e.g., in the case of a large dictionary) to look up another data structure. Thus, decision models that are trained to work directly with the feature vectors are able to perform the work more efficiently.

In addition, in some types of decision models where the size of the input feature sets impacts the model complexity, for example decision tree models where the number of levels correspond to the number of input features, use of the hashing technique reduces the complexity of the model itself. Thus, the resulting models may be much smaller in size, adding to the runtime benefits of feature hashing.

Nonetheless, use of the hashing technique offer represents a tradeoff between the accuracy of a decision system versus its memory usage. As input data to a decision model is more aggressively compressed using feature hashing, the accuracy of the model decreases. To mitigate this problem, an ensemble approach may be used in some embodiments, as show in the figure.

Ensembling may be used to improve the characteristics of classification algorithms. For example, some ensemble methods may be used to reduce the decision variance, bias, or accuracy in decision models. Ensembles of decision models may be trained using ensembled learning techniques. For example, the decision system 100 of FIG. 1 includes three decision models 122, 124, and 126, which may be configured to make the same decision. Given a decision task, all decision models may be trained during ensembled training. The individual results of the decision models 122, 124, and 126 may then be combined using a results combiner 132 to produce a final decision 140 of the decision system 100. In some embodiments, the results combiner 132 may implement a simple vote of the decision models 122, 124, and 126. For example, if the decision results 130 comprise a yes or no value, the results combiner may generate a yes decision if a majority of the models indicate yes, and a no decision if a majority of the models indicate a no. In some embodiments, the results combiner may implement a more complex combining function, which in some cases may also be trained using machine learning techniques. As will be appreciated by those skill in the art, a variety of results combining techniques may be used.

Depending on the embodiment, an ensemble learning process may employ a number of different techniques to balance the accuracy of the resulting decision model and the complexity of the training process. For example, the ensemble learning process may use different methods to allocate the training data set among the different decision models. In some embodiments, a bootstrap aggregation (abbreviated "bagging") technique may be used. In a bagging process, a number n of "bootstrap" data sets is created from the initial training data set. Each bootstrap data set may be used to train one decision model. In some embodiments, to obtain a bootstrap set, the training data set is sampled uniformly in a pseudorandom fashion. The sampling may be performed "with replacement," that is, the sampling permits the same data record to be repeated during training. In some embodiments, the bagging method reduces the variance of linear regression algorithms and the accuracy of decision models such as classifiers. The pseudorandom sampling also speeds up the training process and ensures that each decision model is exposed to different portions of training data and injects a degree of independence to each of the models.

As may be understood, although feature hashing reduces the computation time and memory usage of the decision model, it also reduces the accuracy of the decision model. In some embodiments, the loss in accuracy may be due in large part to collisions between features in the feature vector. However, by collecting multiple feature-hashing models into an ensemble that use independent hash functions, such errors may be reduced. For example, if a feature collision occurs under a first hash function h1, it is unlikely to occur under a second hash function h2. When a sufficiently large number of hash function are used, it is very unlikely that any particular collision will occur in a majority of the models, and these collision errors will no dominate the ultimate decision of the ensemble. Accordingly, errors introduced by the use of feature hashing may be reduced in the aggregate.

Figure 2B:
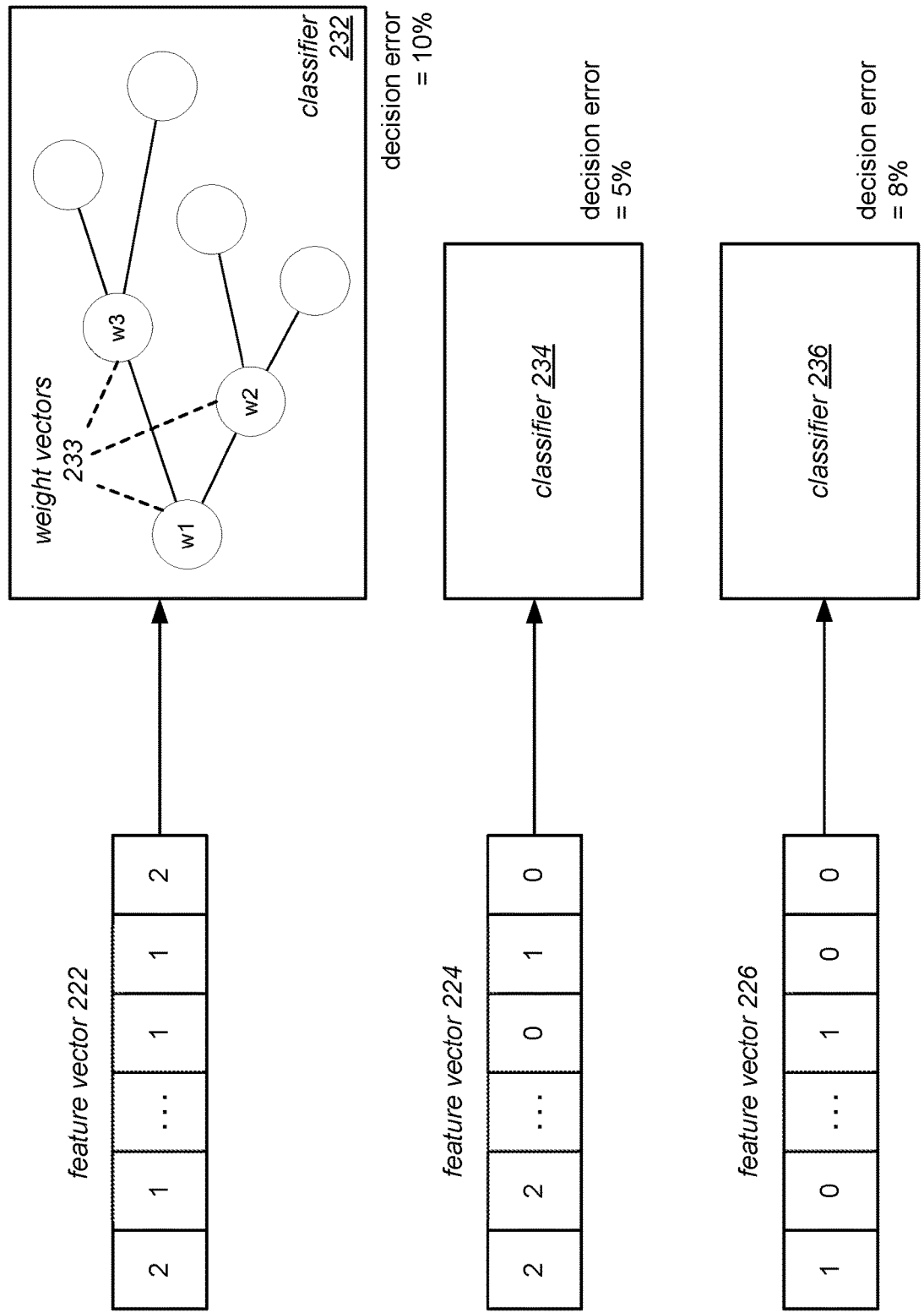
Figure 2C:
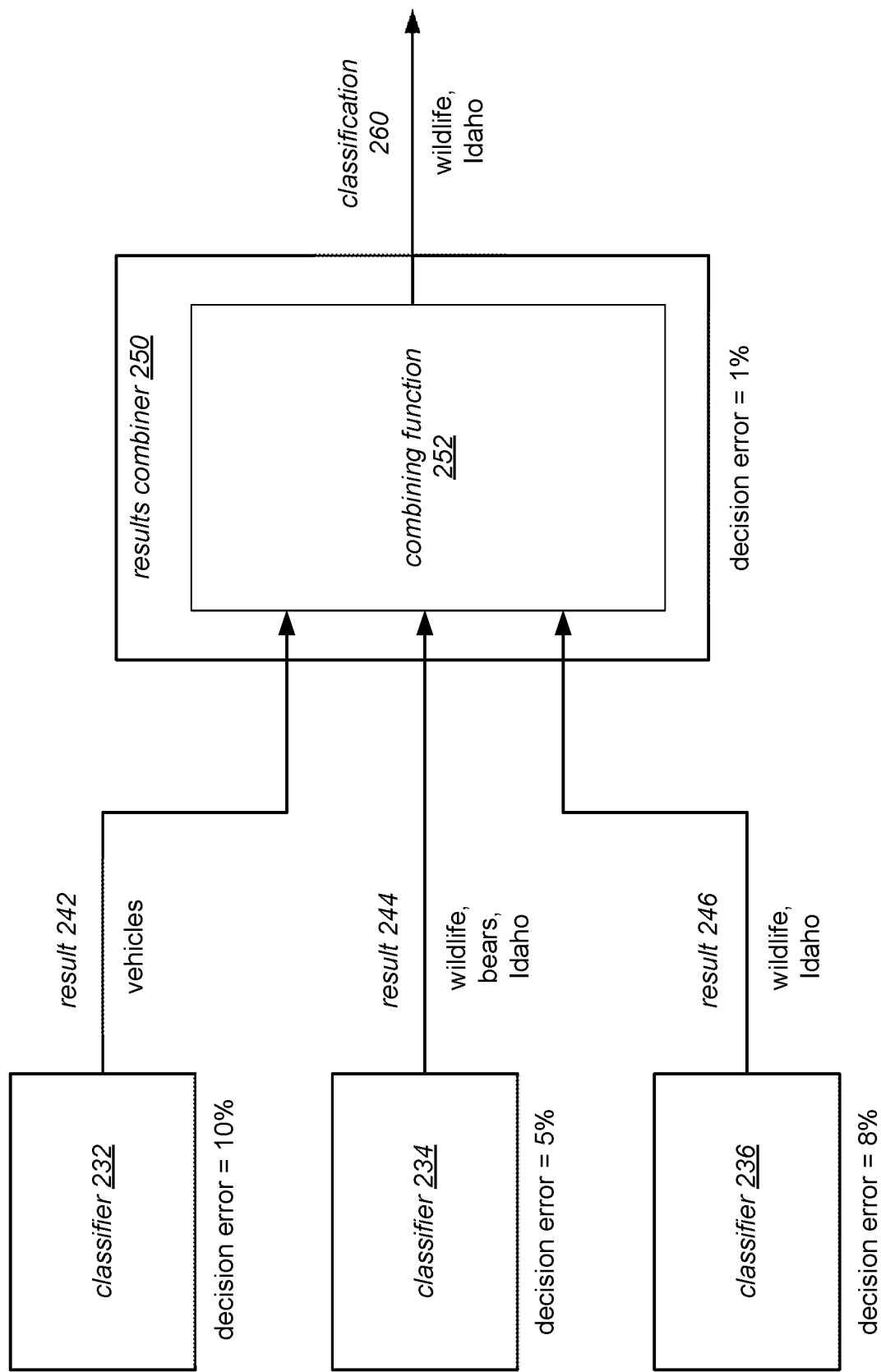

FIGS. 2A to 2C are diagrams illustrating a document classification performed by an ensembled decision system using feature hashing, according to some embodiments. In FIG. 2A, an input document 210 is provided to a decision system. In these figures, the decision system may be configured to make a classification decision to determine one or more classification categories for the document based on the document's contents.

As shown in the figure, the document is reduced to three separate feature vectors 222, 224, and 226, via three different hashing technique operations 212, 214, and 216. As illustrated, each hashing operation assigns a value to a word, which is used as an index to a location in the feature vector. The hashing technique then updates that location in the feature vector to reflect the occurrence of the word. As shown, hashing technique 212 may use a hash function that assigns the word "car" to the first position in the feature vector 222, the word "wheels" to the second position, "miles" to another position, and so on. Some words, for example "breaks" and "backpack," may be assigned to the same location. When multiple features are assigned to the same location in the feature vector, this may indicate a collision condition. The other hashing techniques 214 and 216 may work in a similar fashion to produce different feature vectors 224 and 226, using different hash functions.

In the illustrated example, each occurrence of a word adds one to the value at the determined feature vector location. For example, the word "car" appears twice in the document 210, and so the value of feature vector 222 at the first location is 2. In other embodiments, the value may simply be a Boolean value indicating whether a word appears in the document. Thus, in some embodiments, the feature vector may be a bit vector.

In some embodiments, the hashing technique may employ a second hashing function to generate a signed value for each word. Thus, when collisions occur, differently signed values may be combined at a single feature vector location. This combination may provide additional information to the decision model that uses the feature vector, so that the model can distinguish between features that have been hashed to the same location. In some embodiments, the signed value may be a value that spans a range, for example 5 to −5. This enhancement further adds to the information captured in the feature vector. However, the resulting feature vector will be larger.

In some embodiments, the hashing technique may perform another function to assign different features to different decision models. For example, the hashing functions for the three feature vectors in the illustrated figure may capture occurrences of different words in the document 210. This may serve to further ensure the independence of the decision models in the ensemble, and further reduce the complexity of the models. In some embodiments, the hash function used by the hashing technique may write all features to the feature vector, and then simply drop some number of locations in the vector before the vector is provided to the decision model. In some embodiments, the truncation of the feature vector may be performed pseudo-randomly.

As may be understood, by performing the hashing technique, the feature space of the different decision models is reduced. This reduction allows the models to be trained using less computing resources. In some embodiments, a model may be trained to make its decision from the resulting feature vector directly, without performing a second lookup of a dictionary. In systems where featuring hashing is not used, a lookup operation may be necessary to work with very large but sparse data representations of the input data. However, feature hashing allows the relevant features to be compressed into a denser feature vector, which may be directly used as input data in the decision model.

FIG. 2B depicts a next stage in the decision-making process, where each of the feature vectors 222, 224 and 226 are provided as input to three classifiers 232, 234, and 236. In some embodiments, the classifiers may be implemented using different machine learning models, such as, for example, decision trees, support vector machines, neural networks, Bayesian networks, and the like. Decision trees, in particular, work particularly well with feature hashing, because a reduction in the number of input features reduces the complexity of the decision tree (i.e., the number of levels). Moreover, in some embodiments, the operation of the decision model may depend on a number of vector operations between the feature vector and weight vectors, for example weight vectors 233 in classifier 232. A decision tree may, for example, implement a weight vector at each internal node of the decision tree, which is combined with the feature vector using a dot product operation to generate a branching decision at each node. The weight vectors may have the same dimension as the feature vector. Thus, feature hashing drastically reduces the size and memory requirements of the decision model.

In some embodiments, the different decision models such as classifiers 232, 234, and 236 may operate largely in parallel. Thus, the decision system can produce its ultimate decision more quickly. In some embodiments, each of the classifiers may be used independently. Thus, each classifier may be executed using a different compute node or processor core. In some embodiments, each classifier may execute in a separate process or thread without relying on other classifiers in the ensemble. The size of the feature vector may be selected with the execution environment hardware configuration in mind, so that each decision may be performed by data that fit inside a cache on the computer hosting the classifier.

As illustrated, individually, the classifiers 232, 234, and 236 may exhibit relatively high rates of decision error. This may be caused in part by the feature hashing performed on the input data, which may occasionally cause feature collision. Error may also exist in the individual classifiers for other reasons. These may depend on, for example, the size of the model, the length of training, the quality of the training data, and/or the set of features that is used by the model to make its decision.

Turning to FIG. 2C, the respective results 242, 244, and 246 of the classifiers are combined by a results combiner 250 to produce the ultimate classification decision 260 of the document classification system. In the illustrated system, each of the classifiers generate results that indicate multiple document classifications, such as "vehicles," "wildlife," "bears," and "Idaho." In other embodiments, the results may include only a single classification. In yet other embodiments, for example in the case of regression models, the results may indicate a value within a continuous range.

The results combiner 250 may implement a combining function 252, which combines the results 242, 244, and 246 to produce a ultimate classification decision 260 for the decision system. In some embodiments, the combining function may implement a equal-weight vote by the contributing decision models. For example, in the illustrated example, the ultimate classification decision 260 may include classifications that were indicated by a majority of the classifiers 232, 234, and 236. As shown, because the classifications "wildlife" and "Idaho" were chosen by at least two of the three classifiers in the figure, those classifications are included in the ultimate classification 260.

Depending on the embodiment, different combining functions may be used. For example, in some embodiments, the combining function 252 may implement a weighed voting, where some contributing classifiers are weighed more than other classifiers. These weights may be determined during a configuration step of the decision system based on various factors. For example, more weight may be assigned to models that are more complex, trained for longer periods of time, or those models that performed better during training. In some embodiments, the combining function may implement a staged decision-making process, where some contributing models are first used to reach a first stage decision, and other models are used, in conjunction with the first stage decision, to generate the ultimate decision. In an ensemble of regression models, the ultimate regression result may be generated based on an averaging of the results of the contributing models. For example, the regression result may be computed using an arithmetic or geometric average function, which may assign different weights to the contributing models' results.

In some embodiments, the combining function may be implemented as another model that is trained using machine learning techniques. For example, during training, after the contributing models are trained to a degree, a separate set of training data may be used to train the combining model to make the ultimate decision. For example, the combining model may be a decision tree, a neural network, a Bayesian network, or the like. In some embodiments, the combining function or combining model may receive as input other data that affects its decision-making. For example, in some embodiments, the input may include respective input feature vectors to the contributing models. Thus, the combining model may recognize that certain contributing models perform better for certain types of data or under certain data conditions, and adjust its decision according. Thus, in some cases, the combining model may be more complex than each of the contributing models. In some embodiments, the contributing models may each produce a confidence metric that indicates a confidence level associated with its output result. Accordingly, the confidence metrics are provided to the combining function or model, which may be trained to use these metrics to make its decision.

As shown, the results combiner 250 achieves a decision error rate of just 1%, which is less than the respective decision error rates of each of the contributing classifiers 232, 234, and 236. This result is achieved, in part, because the combining function reduces the effect of the feature hashing performed by the individual classifiers. In particular, because each contributing model hashes features differently, it is unlikely that a majority (or even multiple) models encountered the same type of feature collisions in the same way. Thus, such sources of error are reduced in the aggregate, for example by conducting a vote of all the models. The combining also effectively reduces other sources of error that are particular to each contributing model. For example, in some cases, each model may be designed to only operate over a subset of features, or have been trained only using a certain subset of training data. These issues may cause each model to have blind spots with respect to the data that are unique to the model. These problems with the model are mitigated by ensembling the models.

During experiments, an ensemble of classification decision models was trained to to perform sparse logistic regression using the murmurhashv3 hash function and the DBpedia data set that contains 560,000 training examples and 14 classes labels. The experimental results showed that a reduction in the feature set size caused by feature hashing reduced the amount of training time. For certain types of decision models such as decision tree, the training time improvement is much greater (in some cases by two orders of magnitude), since the size of the feature set has a direct impact on the structure and complexity of the tree. The resulting classifiers were then combined to form a decision ensemble. Different ensembles were constructed that varied both the number of contributing classifiers and the feature vector size of the classifiers. The experimental results show the expected tradeoff between feature vector size and accuracy. However, as the size of the ensemble grows, the accuracy of the ultimate classification by the ensemble converges to almost 99%. In all test configurations, the ensembled classification system produced a result that was more than 97% accurate when the ensemble included 10,000 hash featuring classifiers.

Figure 3:
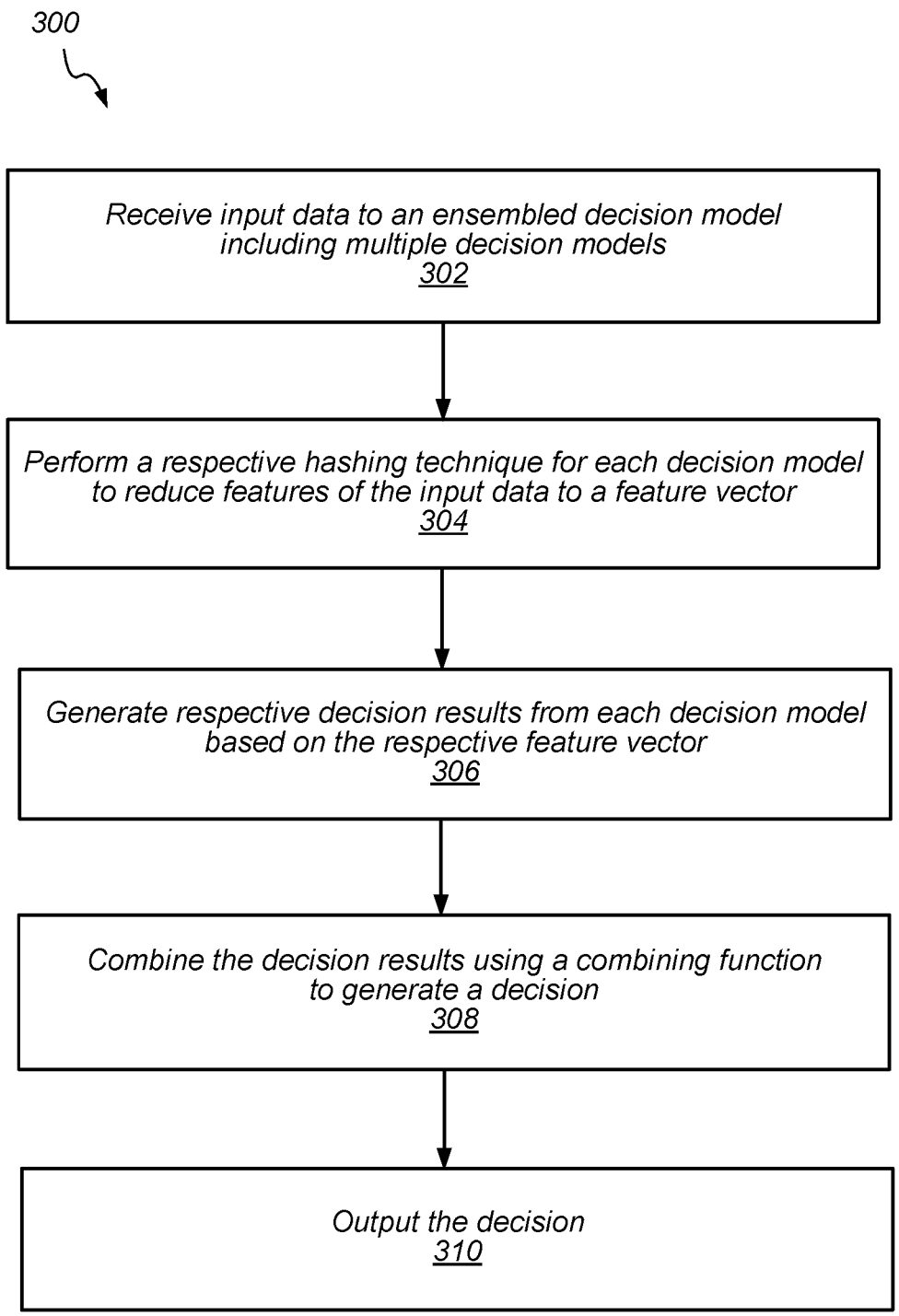
FIG. 3 is a flow diagram illustrating a process of decision making performed by an ensembled decision system using feature hashing, according to some embodiments.

FIG. 3 is a flow diagram illustrating a process of decision making performed by an ensembled decision system using feature hashing, according to some embodiments. The process 300 may be performed by, for example, components of the decision system 100 shown in FIG. 1. For example, in some embodiments, the decision system may be implemented on a group of computers, where the decision models may be executed on different computers in the group in parallel. In some embodiments, the models may be executed on different cores of a multicore processor, or different processes or threads in an execution environment that supports multiple processes or threads. In some embodiments, the decision system may use SIMD computers to take advantage of fine-grained parallelism.

The process begins at operation 302, where input data is received to an ensembled decision model that includes multiple decision models. The decision models may comprise for example the decision models 122, 124, and 126 discussed in connection with FIG. 1. The decision models maybe machine trained to perform the same decision task, such as a classification or regression decision task. However, each model may be trained differently using different training techniques and training data. In particular, at least some of the models may employ different hashing techniques, so that they are trained to make their decisions using different feature vectors. In some embodiments, the different models may be implemented using different types of machine learning models, such as decision trees, neural networks, support vector machines, etc.

At operation 304, each of the models perform a respective hashing technique to reduce features of the input data into a feature vector. The hashing technique may be performed by the model itself as part of the decision-making process, or by a separate element as a separate step. The hashing technique may use a hash function to assign different features into locations in a compressed feature vector, so as to reduce the dimensionality of the feature set that is used by the models. In some embodiments, the size of the feature vector may be chosen so that the model can make its decision using data that will fit into a cache on the machine executing the model. In some embodiments, the feature vector may comprise a bit vector that indicates, at each location, whether a feature hash to that location is present in the input data. In some embodiments, the value at each location may include additional information, such as a number of occurrence of a particular feature seen in the input data. In some embodiments, the hashing technique may implement a second hash function that produces a different value for each feature, which is then combined with the existing value at the assigned location in the feature vector. For example, the second hash function may convert the feature into a signed value. In this manner, even if feature collision occurs in the feature vector, the collision may result in a different value in the feature vector, which may be used by the model to make its decision.

In some embodiments, some or all of the hashing techniques are performed using different hash functions, so that at least some of the models can use different feature vectors to make their respective decisions. In some embodiments, the different hashing techniques may be configured to select different subsets of features to be examined by each model. Such variance in the input data ensure some degree of independence among the different models, which increases the overall accuracy of the decision system.

At operation 306, each decision model in the ensemble generates a respective decision result based on their respective feature vector. In some embodiments, this operation may be performed at least partly in parallel by the models in the ensembled. In some embodiments, the result may be the same type of decision result that is ultimately produced by the decision system. For example, the decision result from a model may comprise a classification that may be ultimately generated by the decision system. In some embodiments, the models may produce a result that is only a portion of the ultimate decision. In some embodiments, the models may generate additional data that is used to generate the ultimate decision. For example, in some embodiments, each decision model may generate a confidence indicator, which indicates the confidence of their respective decision results. This confidence indicator may be used by the results combiner to combine the decision results.

At operation 308, the decision results from the models are combined using a combining function to generate an ultimate decision. The combining function may be implemented as part of a results combiner, such as results combiner 132 or 250, as discussed in connection with FIGS. 1 and 2. In some embodiments, the combining function may implement a vote by the models. In some embodiments, the voting may be a weighed voting, where the results of some models are weight more heavily than others. In some embodiments, the combining function may implement an averaging of the results of the different models.

In some embodiments, the combining function may use input in addition to the decision results of the models to generate the combined decision. For example, in some embodiments, the combining model may also receive as input the respective feature vectors that were used by the individual models. Thus, the combining function may be configured to give different weight to the decision results of the models, based on certain conditions in the input data. In some embodiments, the combining function may be implemented as another model that is trained using machine learning techniques. For example, the combining model may be a separate decision tree, neural network, Bayesian network, or the like.

As discussed, the decision produced by the combining function may achieve an overall error rate that is less than each of the individual error rates of the models in the ensemble. The errors produced by each individual model are due at least partly to the peculiarities of the model, for example, the particular feature hashing function that is used by each model. For this reason, it is highly unlikely that the same error will be made by multiple models, or a majority of the models. Thus, by aggregating the individual decision results from all the of models in the ensemble, the combining function is generally able to eliminate any such errors from the ultimate decision result.

At operation 310, the ultimate decision by the decision system is outputted. In some embodiments, the output may comprise display the result on a graphical user interface. In some embodiments, the output may comprise sending the results to another system, such as a control system or another decision-making system. In some cases, a control system may take an immediate action based on the decision of the decision system. For example, a SPAM filtering system may receive a decision from a document classifier system, which classifies an incoming email as SPAM. The SPAM filtering system may then immediately place the incoming email in a SPAM folder of the receiving user.

Figure 4:
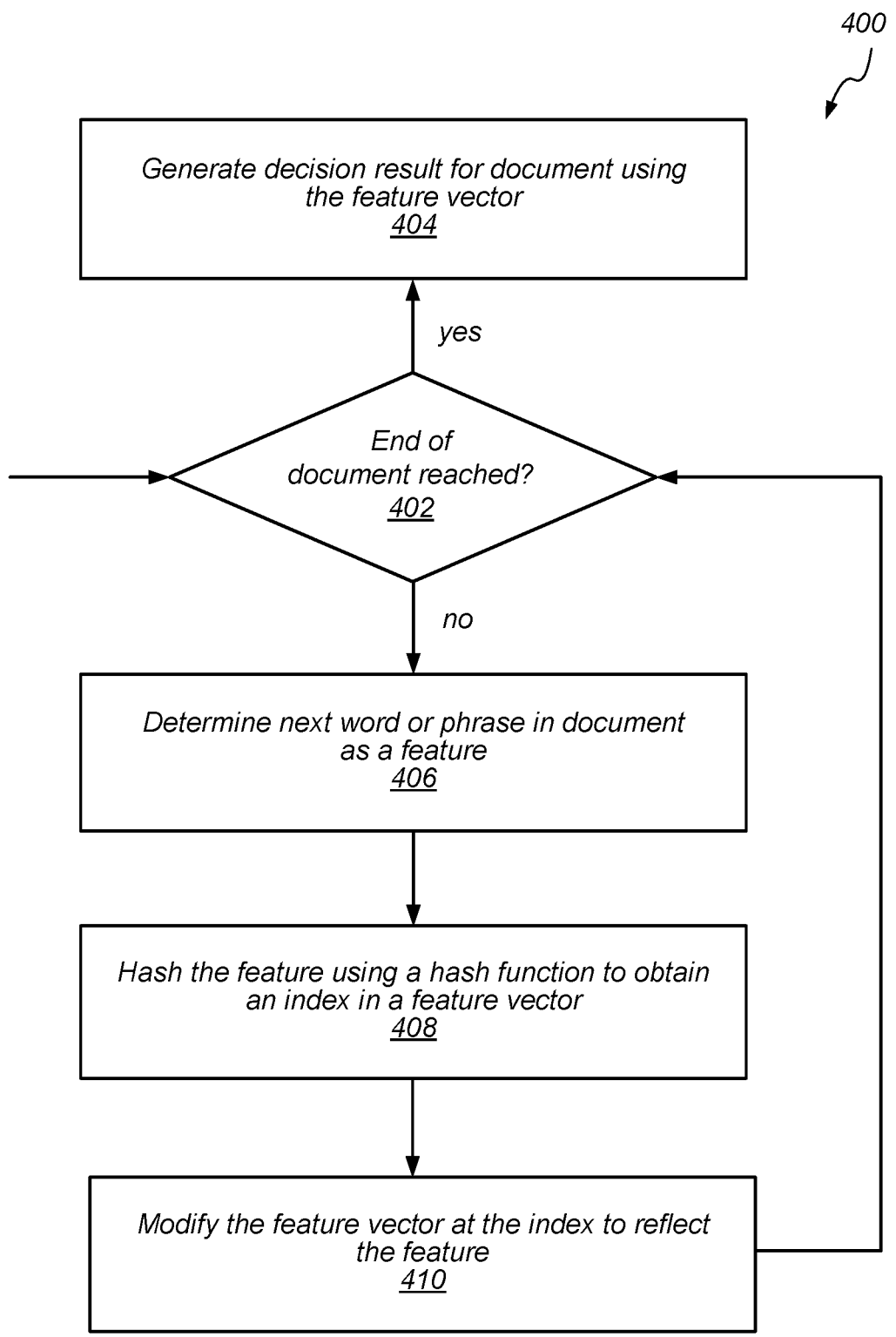
FIG. 4 is a flow diagram illustrating a process of building a feature vector used by an ensembled decision system using feature hashing, according to some embodiments.

FIG. 4 is a flow diagram illustrating a process of building a feature vector used by an ensembled decision system using feature hashing, according to some embodiments. Process 400 may be performed as part of the operation 304, discussed in connection with FIG. 3. As discussed, the hashing technique may be performed by each of the models in the ensemble, or by a separate element in a separate step to produce an input feature vector to the individual models. As shown in the figure, process 400 may be used to generate a feature vector from a document that captures features from the document which indicate the presence or frequency of words that appear in the document.

In some embodiments, the process 400 may iterate over a document to capture the words in the document in multiple feature vectors for the multiple models in the ensemble. In some embodiments, the feature vectors may be built in parallel in a single pass of the input document. The process may capture individual words as features, or in some embodiments, particular sequences of words. Thus, operation 402 indicates a part of a loop that is repeated over an input document, to record each word or phrase feature from the document. The process repeatedly performs operation 402 to check if the end of the document is reached. If so, the feature vector building process is complete, and the process proceeds to operation 404, which provides the feature vector to the decision model to generate a decision result. If not, the process takes an iteration through the loop to record the next feature in the document.

If the end of the document is not reached, at operation 406 a next word of phrase in the document is determined as the next feature. In some embodiments, this operation may be performed by a parser, which may in some embodiments generate word or phrase tokens from the document in a single pass.

At operation 408, the determined feature is hashed using a hash function to obtain an index in the feature vector. For example, the hash function may be selected to compress all features in the feature universe to a feature vector of a certain length, which places an upper bound on the amount of memory that will be required to use and train the decision model. The hash function may hash a dictionary of English words uniformly to a range of numbers, which represent all possible indexes in the feature vector. In some embodiments, the hash function may be configured to hash a certain subset of features to a set of values that are not recorded in the feature vector (e.g., beyond the feature vector's maximum index). In this manner, different feature vectors may include different subsets of features in the document.

At operation 410, the feature vector is modified at the index to reflect the hashed feature. Thus, for example, if a word in a document is hashed to index position 50 in a feature vector of length 100, the value of the feature vector at position 50 may be incremented by 1, to reflect the word in the document. In some embodiments, the feature vector may be a bit vector that reflects the presence of a particular feature. In some embodiments, the feature vector may be a vector of integers that indicates a count of each feature that appears in the input data. In some embodiments, the hash technique may involve a second hash using a second hash function, that produces a second value for each feature, for example, a signed value. The second value may be used to modify the feature vector at the determined index, so that features that collide at the same index may produce different values. Such use of a second hash value allows the decision model to recognize differences between difference instances of feature collision. For example, where two words are hashed to the same index, a positive value may indicate that the first word appeared more often than the second word. When the feature has been successfully reflected in the feature vector, the process loops back to operation 402, to repeat the process for the next feature in the document.

Figure 5A:
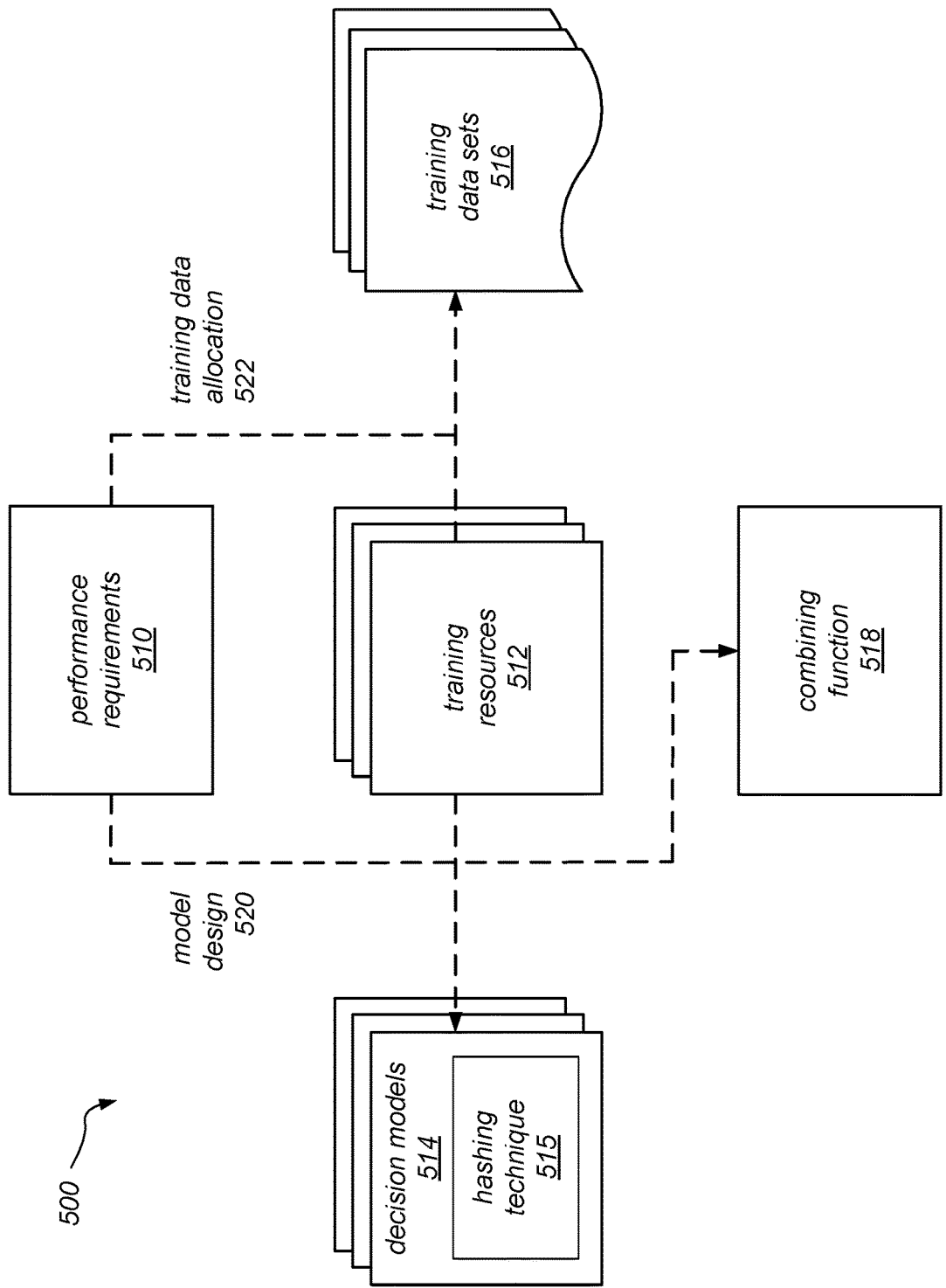
FIGS. 5A to 5C are diagrams illustrating a training of an ensembled decision system using feature hashing, according to some embodiments.
Figure 5B:
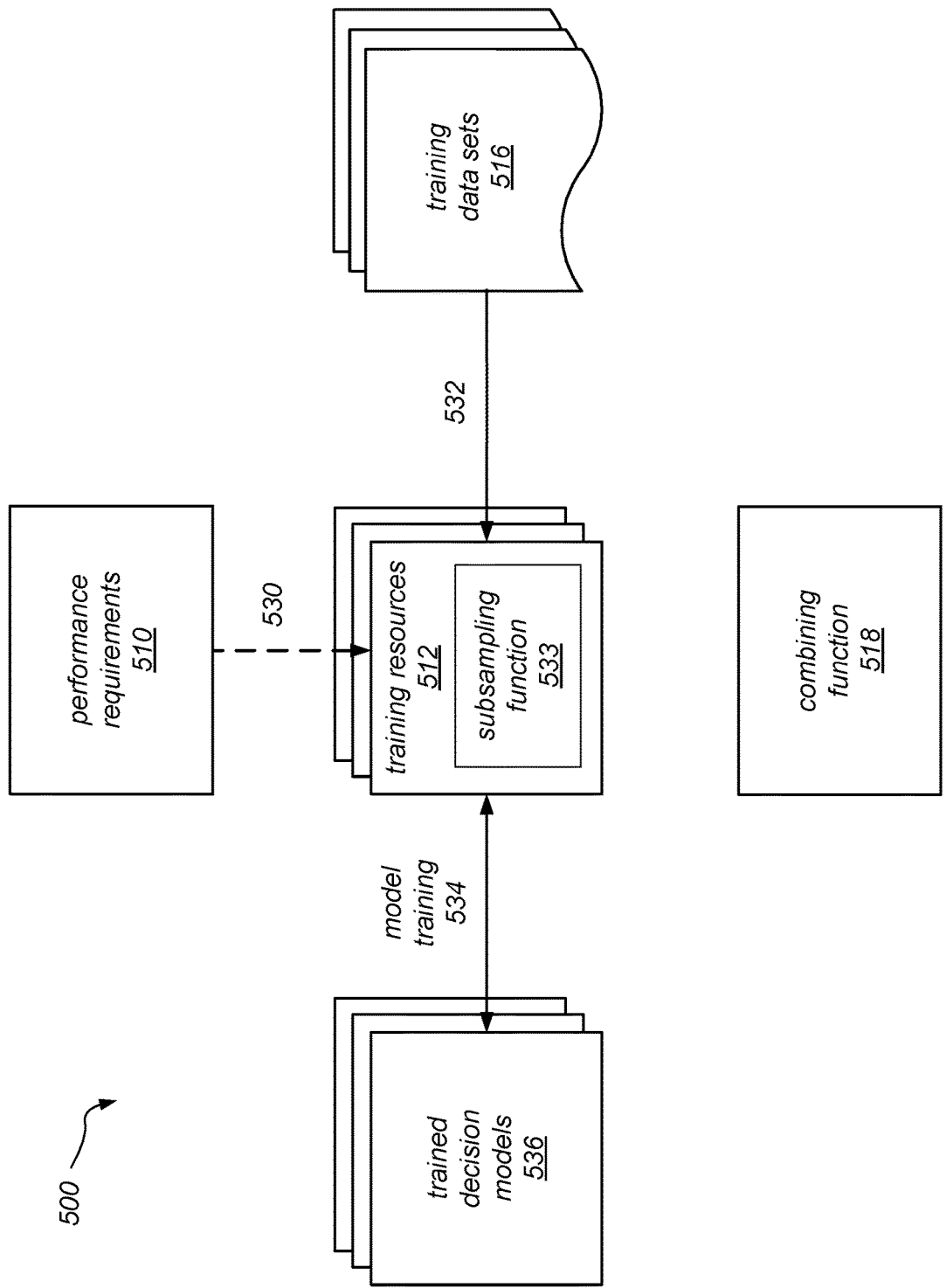
Figure 5C:
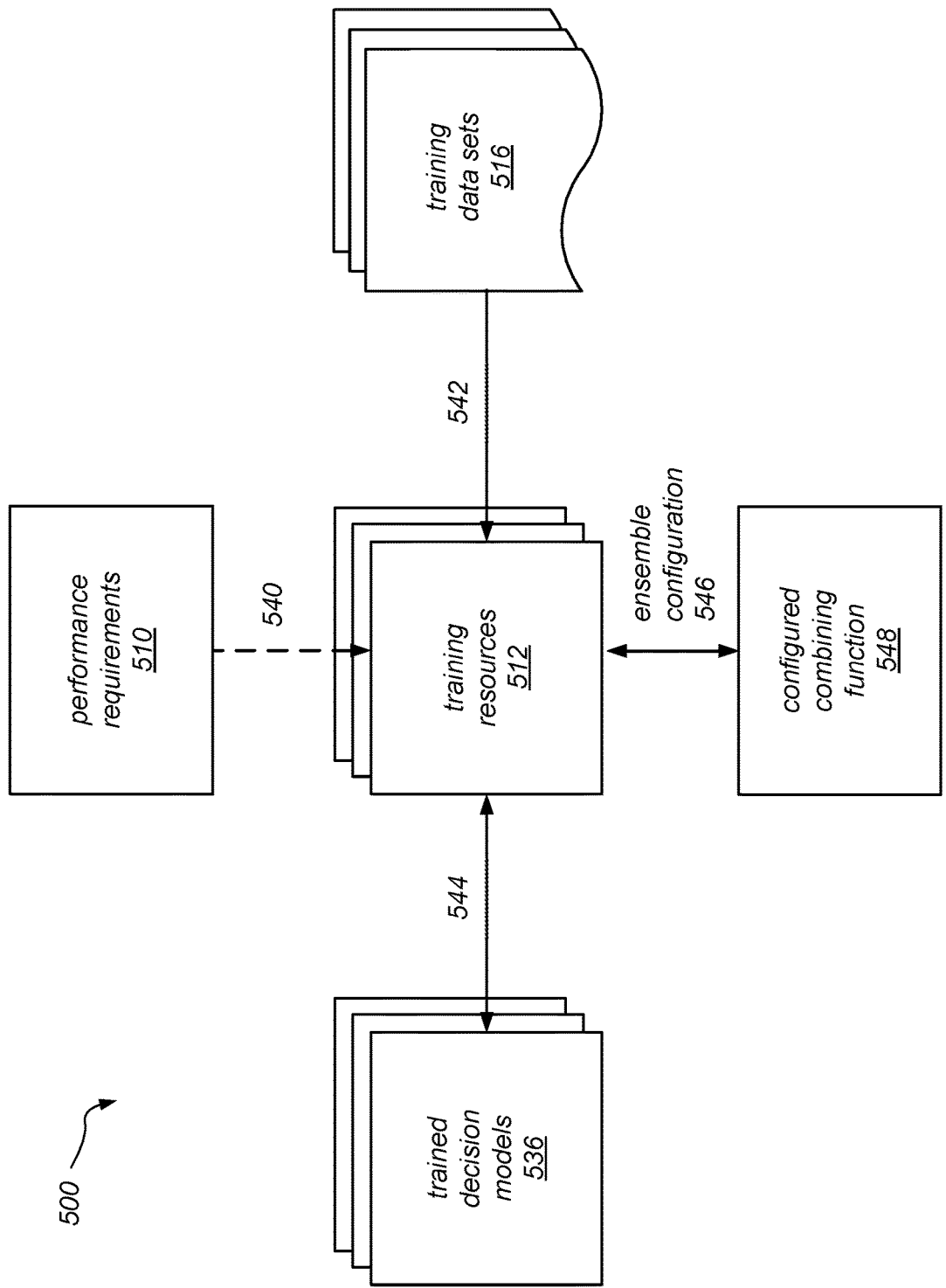

FIGS. 5A to 5C are diagrams illustrating a training of an ensembled decision system using feature hashing, according to some embodiments. FIG. 5A illustrates a first stage in an exemplary training process, which includes a model design process 520 and an allocation of training data 522.

At the outset, a model designer may be provided with a set of performance requirements 510 for the ensembled decision model and a set of training resources 512. The performance requirements 510 may specify certain parameters of the decision system, such as limits on memory and storage usage requirements, speed requirements, and accuracy requirements, for example. The training resources 512 may include one or more computer systems that are available to be used to train the decision models used for the decision system. In some cases, the training resources may include a cluster of compute nodes that are networked together. In some embodiments, the training resources may include a number of storage resources to store training data, truth labels, and the models themselves. Such storage resources may be implemented as, for example, databases, file systems, and the like.

Based on the performances requirements 510 and the training resources 512, a model designer may select a number of decision models 514 for the ensemble. For example, the model designer may determine that, in order to meet an accuracy requirement contained the performance requirements 510, the decision system may employ an ensemble of 1,000 separately trained decision model 514. The model designer may also determine a training plan for the decision models 514, based on the available training resources 512. For example, in a case where the training resources 512 comprise a cluster of 250 nodes, the training plan may assign four decision models to each node, to be trained in parallel.

In some cases, the model designer may also select a respective hashing technique 515 for each of the decision models 514. The hashing technique may be chosen so that the resulting feature vectors produced by the hashing technique are of a certain size, such that the decision models may be sufficiently trained given the available training resources 512, to satisfy the performance requirements 510. In some cases where some decision models 514 are limited to certain subsets of features in the feature universe, the hashing technique 515 may be chosen to ignore certain features of the input data. In some embodiments, the hash function used by the hashing techniques 515 may be generated using a hash function generation function, which may ensure some degree of independence among the hash functions.

In some cases, the model designer may also select a combining function 518, which is used to combine the decision results of the decision models 514. The combining function may implement an equal weight voting of the decision models 514, or some other method of combining results, such as a weighed voting, an averaging, or a determination by another machine learned model. The combing function 518 may be chosen based on the performance requirements 510 and, if training is required, the amount of available training resources 512.

In some cases, the model designer may make an allocation 522 of the training data to be used to train each decision model 514. By using different data to train the individual decision models 514, the resulting models may behave slightly differently, thereby enhancing the overall accuracy of the ensembled decision system. The allocation of training data may be made at least partly in a pseudo-random fashion. In some cases, the training data may be divided into equal sets 516 to be used for each of the decision models. In some cases, the training data sets 516 may have some overlap from one set to the next. In some cases, the training data sets 516 may be chosen to group certain sets of features together for certain decision models 514. For example, in a SPAM email classification example, the training data may be divided by the sender's email address, so that certain decision models may be trained to specialize on emails from particular senders. In some cases, no allocation may be made at the training process design stage. Instead, at training time, the training data may be randomly subsampled to obtain a training set for each decision model.

FIG. 5B illustrates a next stage in the exemplary training process. At this stage, the decision models are trained into trained decision models 536. As shown, the training may be performed using the training resources 512 and the training data sets 516. In some cases of supervised learning, the training may involve repeatedly executing the decision models on the training data sets, comparing the decision results against predetermined truth labels, and then incrementally modifying the decision models to improve their performance. As shown, in some cases, the training may use a subsampling function to sample data from the training data sets to use to train each of the decision models. In some cases, the subsampling may be performed pseudo-randomly. In some cases, the training may be controlled at least in part by the performance requirements 510. For example, the performance requirements may specify that each individual decision model may be trained to a certain degree of accuracy, before training for that model is stopped. In some cases, the performance requirements 510 may prevent excessive training of the individual models, to avoid problems such as overfitting of data. In some cases, model training process 534 may train each decision model at least partly in parallel. This parallelization allows the training process to complete more quickly.

FIG. 5C illustrates a next stage in the exemplary training process. At this stage, the training has ceased on the trained decision models 536. As shown, the training may then proceed to a ensemble configuration process 546, in which the combining function is configured to produce a configured combining function 548. The configuration may be performed to tune the combining function to improve its decision accuracy. For example, the configuration may adjust the weights of a weighed averaging function to provide more weight to the results of certain decision models (e.g., those that have higher accuracy scores). In some cases, the combining function may receive other inputs, allowing the combining function to vary the weights for each of the decision models based on the circumstance. For example, in a SPAM detection system, the combining function may receive as input the time of day that a particular email is received, and give more weight to particular decision models that have shown to be highly accurate for emails received during this time.

In some cases, the combining function 548 may comprise a different machine learned model, such as a decision tree, a neural network, and the like. The combining function may thus be trained in a meta learning stage of the training process. During this stage, the trained decision models 536 may be used to generate 544 decision results from another training data set 516. The data set used for training the combining function may be different from the data sets used to train the decision models, thus reducing the potential for bias during the meta learning stage. The training resources 512 may then repeatedly execute the combining function to generate ensembled decisions, and then incrementally modify the combining function until a desired accuracy is achieved, as may be specified by the performance requirements 510.

In some cases, the model designer may iteratively add or remove decision models 536 from the ensemble, based on their performance results. For example, in some cases, the model designer may eliminate from the ensemble certain decision models that do not achieve a threshold accuracy level. The model designer may also eliminate decision models that add little or no independent decision-making value to the ensemble. In some cases, new decision models may be added to the ensemble to focus on certain difficult data cases in the training data sets. After the ensemble is updated to add and remove certain decision models in this manner, another round of training may be performed to train the newly added decision models and the combining function.

Figure 6:
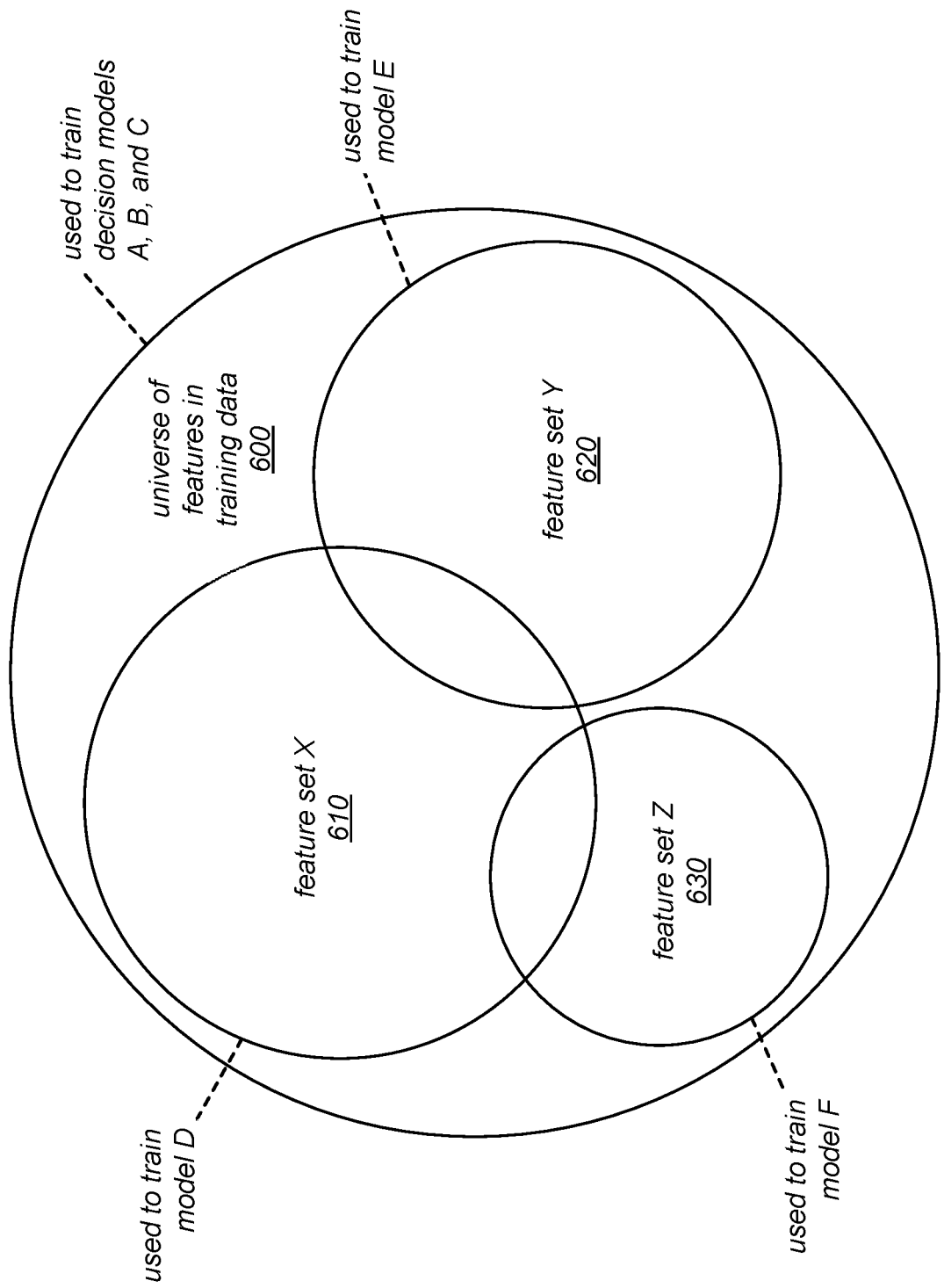
FIG. 6 is a set diagram illustrating the use of feature sets to train an ensembled decision system using feature hashing, according to some embodiments.

FIG. 6 is a set diagram illustrating the use of feature sets to train an ensembled decision system using feature hashing, according to some embodiments. As discussed, in some embodiments, different decision models in the ensembled may be trained using different subsets of features in the training data. This technique allows different models in the ensemble to specialize on different types of features in the input data, so that an combination of the different decision results leads to a more accurate overall decision.

As illustrated in the figure, in one example, a universe of features 600 in the training data may be used to train models A to F. Models A, B, and C may be trained using the entire universe of features 600. Although these three models are trained using the same set of features, they may still be trained in different manners. For example, the three models may each employ a different hashing technique or a different training data subsampling function. In addition, the figure shows three subsets of features of the universe, feature set X 610, feature set Y 620, and feature set Z 630, which are used to train models D, E, and F, respectively. Thus, models D, E, and F, are trained to specialize on these respective subsets of features. As shown, these feature subsets may in some cases have some overlap, and in other cases not.

The selection of feature sets for the different decision models may be performed either manually or programmatically. For example, in some embodiments, the feature subsets X, Y, and Z may be selected by a machine in a pseudo-random manner. In some cases, some of the feature subsets may be selected manually by a model designer. The selected subsets may represent a set of features that are related in some fashion, which may indicate certain information about the input data that is relevant to the decision-making process. For example, in an ensembled decision system that performs email SPAM filtering, a first set of features may comprise just the words in the email title, a second set of features may comprise the words of the first paragraph, and so on. In this manner, the ensembled decision system may be trained to specialize on these macro features in the email.

In some embodiments, the features set seen by a decision model may be limited by the hashing technique. For example, in some embodiments, the hashing technique may hash all features in the feature universe uniformly to 100 distinct index values, but only present a feature vector of length 90 to the decision model. Thus, any feature that are hash to the 10 excluded index values are not seen by the decision model. In some embodiments, feature filtering may be performed in other ways, for example, during the parsing of the input data. In some embodiments, decision models may be added to or removed from the ensemble in iteratively, based on the overall performance of the ensemble. Models that are trained to examine feature sets that are deemed to be not probative of the ultimate decision may be removed. In some embodiments, the performance of the ensemble may be boosted by introducing additional models to focus feature sets that are not being sufficiently analyzed in an existing ensemble. In some embodiments, training for certain feature sets that are complex may be trained for longer periods, and using a larger subsample of training data.

Figure 7:
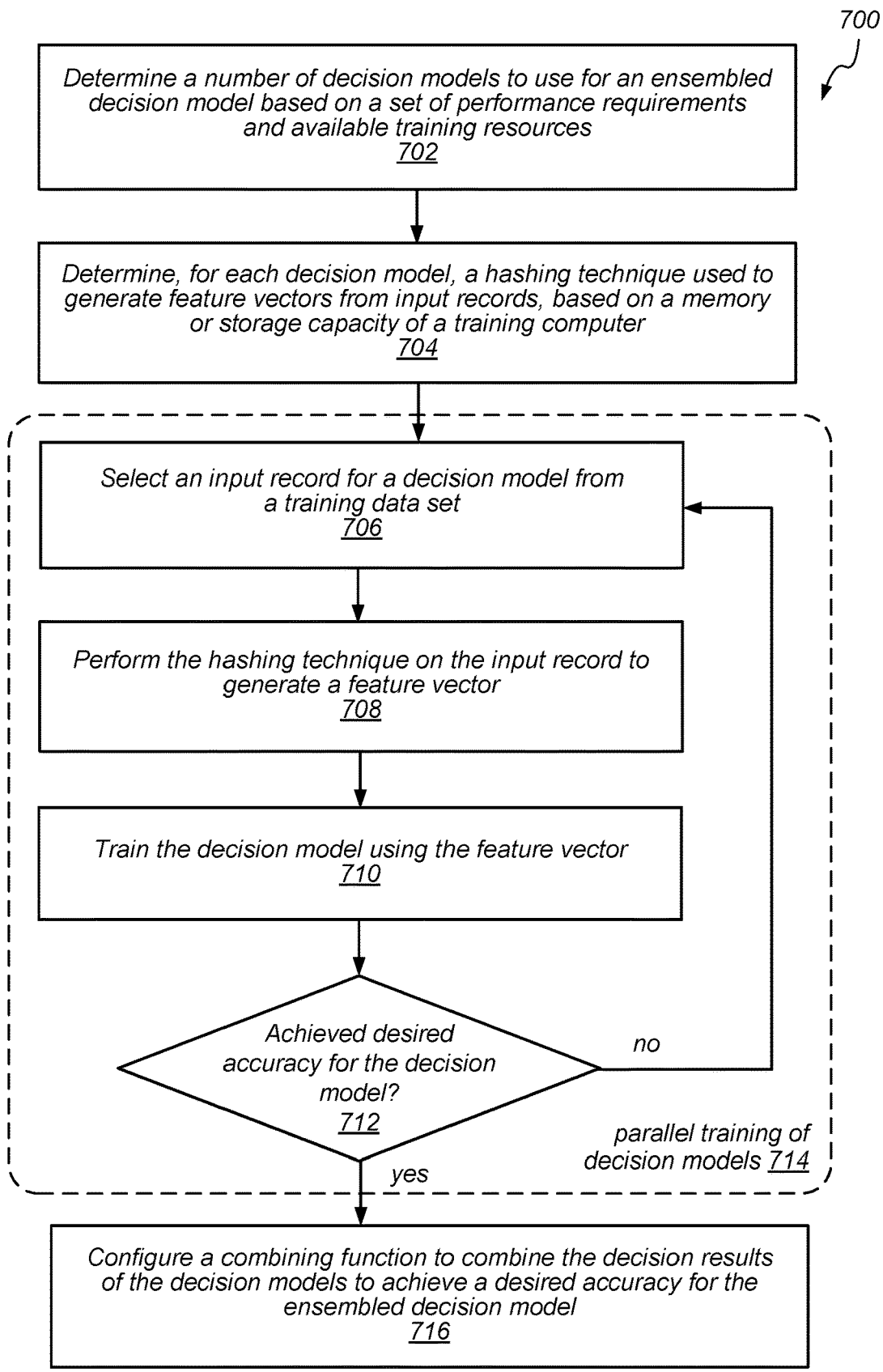
FIG. 7 is a flow diagram illustrating a process of training an ensembled decision system using feature hashing, according to some embodiments.

FIG. 7 is a flow diagram illustrating a process of training an ensembled decision system using feature hashing, according to some embodiments. The process 700 may be performed, at least in part, by the training resources 512, as discussed in connection with FIGS. 5A to 5C. For example, in some embodiments, the training resources may comprise a cluster of compute nodes that are loaded with training software, configured to perform machine learning techniques to train individual models in an ensembled decision system. In some embodiments, the training system may comprise one or more computers implemented using multiple processor cores, such that the training of the models may be executed exclusively on a single core. In some embodiments, each training of a model may be implemented as an independent process or thread that can execute without reliance on other model training processes or threads. In some embodiments, a training session may be divided into a plurality of steps, and a training management module may be configured to assign different steps to different nodes or processors in the training cluster. As discussed in some embodiments, the hashing technique may be selected such that the training of each model or each training step may be accomplished using cached data. Thus, for example, the hashing technique may reduce the features of a large feature universe down to a feature vector small enough to fit in the cache of a particular training node.

At operation 702, a number of decision models to use for an ensembled decision model is determined. The number of decision models may be based on a set of performance requirements and/or the available training resources. For example, in some cases, an ensemble of a certain size may be required to achieve a certain accuracy level, as specified in the performance requirements. In some cases, the number of models may be limited by the number of computers available to perform the training. In some cases where there are not sufficient computing resources to train all of the models in the desired ensemble in a single pass, the training may be performed in piecemeal in multiple stages. In some embodiments, this process may be controlled by a training scheduler module implemented by a training management system. In some embodiments, the determination of decision models may be performed programmatically based on particular parameters of the training system and the performance requirements. In some embodiment, at least certain aspects of the models are selected manually, by a model designer.

At operation 704, a hashing technique is determined for each decision model. The hashing technique may be used to generate feature vectors from input records to the decision model. The determination of the hashing technique may be performed based at least in part on a memory or storage capacity of a training computer that is used to train the decision model. For example, the hashing technique may be chosen to reduce the input data to the decision model down to a certain size, so that the training of the model may be performed completely using cached data. In some embodiments, the hashing technique may be selected programmatically, based on a selection algorithm. The selection algorithm may implement the selection in a pseudo-random fashion. In some embodiments, the selection may be performed at least in part manually, via the input of a model designer. In some embodiments, the hashing technique may be chosen to exclude certain features from the feature universe, so that certain models are exposed to only subsets of features from the feature universe. The selection of the hashing technique and feature sets may be performed so as to ensure some degree of diversity or independence among the models to be trained.

As shown, operations 706, 708, 710, and 712 may comprise operations of an iterative machine training process for each individual decision model. The training of the individual models of the ensemble may be performed at least partly in parallel in a parallel training process 714. For example, each model in the ensemble may be trained on a different node of a cluster of training machines, independent of the other models.

At operation 706, an input record for a decision model is selected from a training data set. In some embodiments, the selection of an input record may be performed using a subsampling function, which pseudo-randomly selects records from a shared training data set for multiple models. In some embodiments, the subsampling function may allow for repeat records to be selected for a single model. The selection may occur in bulk to select a random chunk for each model to be trained, based on some algorithm. In some embodiments, the selection algorithm may prefer certain records for certain models. For example, for a model that is designed to focus on a certain set of features in the feature universe, the selection algorithm may select a sample of input records that exhibit a degree of variance for these features. In some embodiments, a subset of training data for each model may be copied to each node, so that no sharing overhead is incurred during the parallel training.

At operation 708, a hashing technique is performed on the input record for a given model to generate a feature vector for the model. As discussed, each model in the ensemble may implement a different hashing technique, so that they are trained with different input feature vectors. In some embodiments, the hashing technique may involve hashing all features seen in an input record into a feature vector. For example, each feature may be hashed to an index value in the feature vector, and the feature vector may then be updated at that index location to reflect the feature. In some embodiments, the feature vector may simply record the presence or absence of each possible feature, for example using a Boolean value. In some embodiments, the feature vector may record a frequency of each feature. In some embodiments, the feature may be hash a second time using a second hash function to produce a feature value. The feature vector may then be modified at the index location based on the feature value. For example, in some embodiments, the feature value may be a signed value determined based on the feature. By using different feature values for each feature, the effects of feature collision in the feature vector may be reduced.

At operation 710, the decision model is trained using the feature vector. By using the feature vector, the model may be trained using a training machine with a predetermined memory, storage, and processing capacity. For some types of decision models, such as decision trees, reducing the number of input features also places a limit on the ultimate complexity of the model. For example, the number of levels of a decision tree model may be dependent on the number of input features (e.g., the size of the input feature vector). In some embodiments, the decision model may rely on repeated vector operations between the feature vector and weight vectors of the same dimensionality. The weight vectors may be repeatedly updated as the training progresses. Thus, the feature hashing reduces the need to computing resources need for the training in multiple ways.

At operation 712, a determination is made whether a desired accuracy has been achieved for the given model being trained. In some embodiments, each model in the ensemble may be trained to attain a certain accuracy level or error rate. In some embodiments, each model may be trained for minimal amount of time. If the desired accuracy is achieved, training on the given model is stopped and the process proceeds to operation 716. If not, the process loops back to operation 706, and the given model is trained further using additional input records.

At operation 716, a combining function is configured to combine the decision results of the decision models to achieve a desire accuracy or error rate for the ensembled decision model. Operation 716 may be performed when all individual decision models in the ensemble have been trained. In some embodiments, the combining function may simply implement an equal-weight vote by the trained models of the ensemble. In some embodiments, the combination function be weighed (e.g., a weighed vote or weighed averaging) so that the decision results of certain models are according more weight in the overall decision. These weights may be configured, either manually or programmatically, based on conditions such as the accuracy level of the individual models achieved during training. In some embodiments, the models themselves may be configured to generate output that indicates a confidence indicator of their respective decisions. Such indicators may be used to configure the weights used in the combining function. In some embodiments, the combining function may comprise a combining model that is also trained using machine learning techniques. For example, the combining function may implement a decision tree or neural network, etc. Thus, after the training of the individual models in the ensemble is completed, a further training may be performed on the combining model to achieve the desired accuracy for the overall model. This training may be performed by using the trained models in the ensemble to generate test results using additional training data, feeding those results to the combining model, and then adjusting the parameters of the combining model based the accuracy of its decisions.

Figure 8:
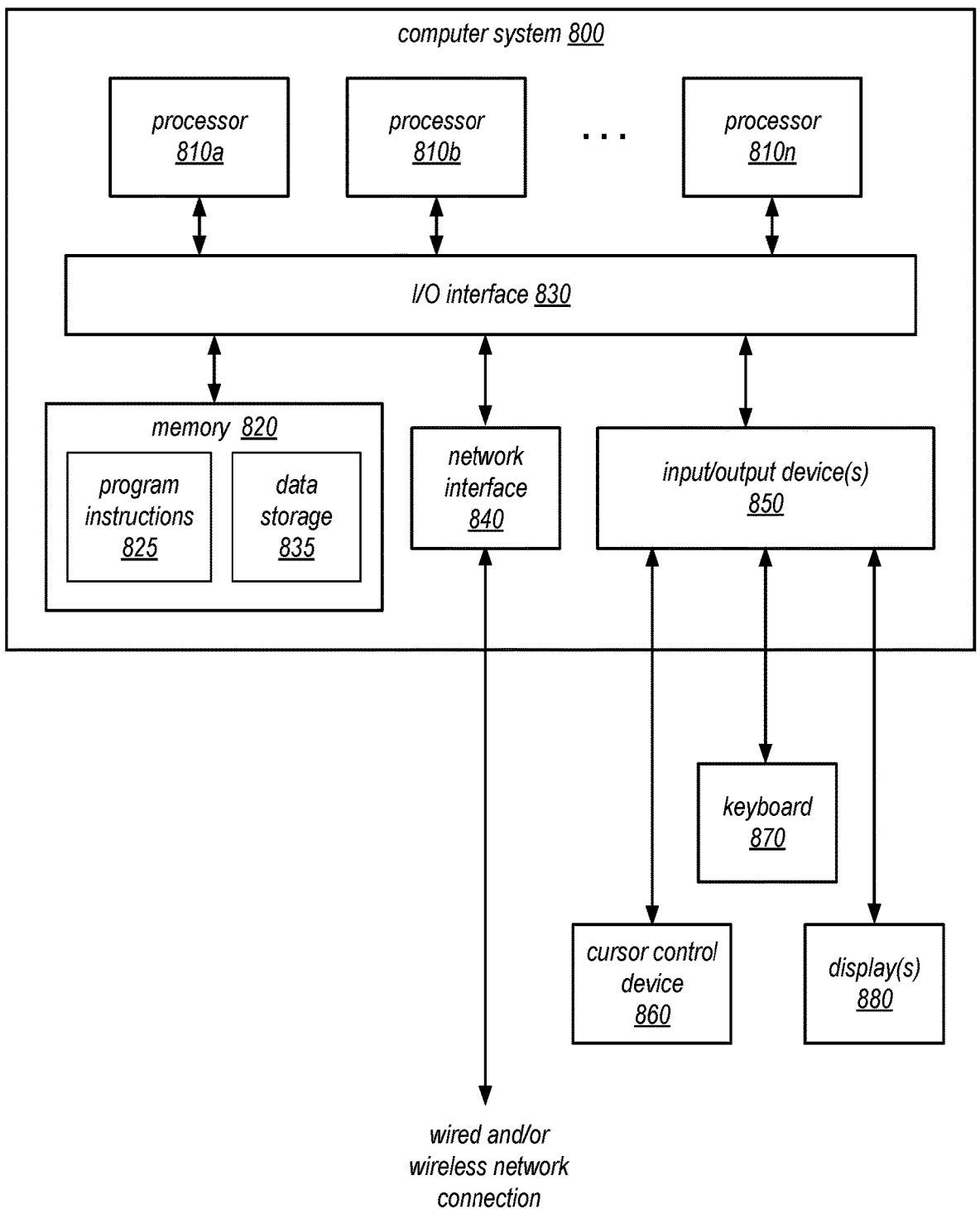
FIG. 8 is a block diagram illustrating a computer system that may be used to implement an ensembled decision system using feature hashing, according to some embodiments.

Various components of embodiments of the techniques and methods described herein for providing ensembled decision systems using multiple decision models employing feature hashing. One such computer system or computing device is illustrated by FIG. 8. In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some embodiments, it is contemplated that embodiments may be implemented using a single instance of computer system 800, while in other embodiments multiple such systems, or multiple nodes making up computer system 800, may be configured to host different portions, components, or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

In some embodiments, at least one processor 810 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of graphical algorithms. For example, a graphics processor may implement a number of graphics primitive operations in a way that makes executing them much faster than drawing directly to the screen with a host central processing unit (CPU). The GPU(s) may implement one or more application programmer interfaces (APIs) that permit programmers to invoke the functionality of the GPU(s).

System memory 820 may be configured to store program instructions and/or data accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for various embodiments of methods for providing enhanced accountability and trust in distributed ledgers including but not limited to methods for processing distributed ledger messages as a sender node and/or as a receiver node as illustrated in FIGS. 2 through 6, are shown stored within system memory 820 as program instructions 825 and data storage 835, respectively. In other embodiments, program instructions and/or data may be received, sent or stored upon different types of computer-accessible media or on similar media separate from system memory 820 or computer system 800. Generally speaking, a computer-accessible medium may include storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. In addition, in some embodiments some or all of the functionality of I/O interface 830, such as an interface to system memory 820, may be incorporated directly into processor 810.

Network interface 840 may be configured to allow data to be exchanged between computer system 800 and other devices attached to a network, such as other computer systems, or between nodes of computer system 800. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or retrieving data by one or more computer system 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

As shown in FIG. 8, memory 820 may include program instructions 825, configured to implement embodiments of the methods for providing enhanced accountability and trust in distributed ledgers, and data storage 835, comprising various data accessible by program instructions 825. In one embodiment, program instructions 825 may include software elements of embodiments of the methods for providing enhanced accountability and trust in distributed ledgers, as illustrated in the above Figures. Data storage 835 may include data that may be used in embodiments. In other embodiments, other or different software elements and data may be included.

Those skilled in the art will appreciate that computer system 800 is merely illustrative and is not intended to limit the scope of the methods for providing enhanced accountability and trust in distributed ledgers as described herein. In particular, the computer system and devices may include any combination of hardware or software that can perform the indicated functions, including computers, network devices, internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

The various methods as illustrated in the Figures and described herein represent examples of embodiments of methods. The methods may be implemented in software, hardware, or a combination thereof. The order of the methods may be changed, and various elements may be added, reordered, combined, omitted, modified, etc.

Although the embodiments above have been described in considerable detail, numerous variations and modifications will become apparent to those skilled in the art once the above disclosure is fully appreciated. For example, although many of the embodiments are described in terms of a classification system for documents, the ensembled decision system may take different forms, be used in other applications, and make different types of machine-learned decisions. In addition, although this disclosure describes particular types of decision models, model designs, and training techniques, it should be understood that these details may be implemented differently in other embodiments and contexts, and in some instances optional. In general, the teachings of this disclosure are provided in terms of examples, which are used to explain the inventive concepts presented herein. These examples do not limit the inventive concepts.

What is claimed:
1. A system, comprising:
  one or more processors with associated memory storing program instructions that when executed on the one or more processors implement a decision system comprising:

a feature vector generator configured to perform a plurality of hashing techniques on an input record to reduce features of the input record to a plurality of feature vectors, wherein the feature vectors are sized to fit in units of a cache to be accessed in parallel using a single instruction multiple data (SIMD) operation, wherein individual ones of the feature vectors are generated based on a hash of individual features of the input record modulo a vector size, and wherein the vector size is selected based on a size of the units of the cache;

a plurality of decision models trained using a machine learning technique, each decision model configured to, in parallel, generate a decision result based on one of the feature vectors in the cache, wherein the feature vectors are accessed in parallel using the SIMD operation; and a results combiner configured to combine the decision results of the plurality of decision models to generate a decision, wherein an error rate of the decision system is less than individual error rates of the decision models.

2. The system of claim 1, wherein to perform a hashing technique, the feature vector generator is configured to:
for a given feature in the input record:
hash the feature using a hash function associated with a decision model to obtain an index in the feature vector; and
modify the feature vector at the index to reflect the feature.

3. The system of claim 1, wherein:
the input record comprises a document,
the features indicate a presence of words or phrases in the document, and
the decision generated by the decision system comprises a classification of the document.

4. The system of claim 1, wherein a given decision model in the plurality of decision models comprises a decision tree.

5. The system of claim 1, wherein the results combiner generates the decision based at least in part on a vote of the plurality of decision models.

6. The system of claim 1, wherein the results combiner generates the decision based at least in part on an averaging of the decision results of the plurality of decision models.

7. The system of claim 1, wherein the results combiner comprises a combiner model trained using another machine learning technique to generate the decision based at least in part on the decision results of the plurality of decision models.

8. A non-transitory, computer-readable storage medium storing program instructions that when executed on one or more computers cause the one or more computers to:
perform a plurality of hashing techniques on an input record to reduce features of the input record to a plurality of feature vectors, wherein the features vectors are sized to fit in units of a cache to be accessed in parallel using a single instruction multiple data (SIMD) operation, wherein individual ones of the feature vectors are generated based on a hash of individual features of the input record modulo a vector size, and wherein the vector size is selected based on a size of the units of the cache;
generate a plurality of respective decision results from a plurality of decision models in parallel based the feature vectors in the cache, wherein the feature vectors are accessed from the cache in parallel using the SIMD operation, wherein each decision model is trained using a machine learning technique; and
combine the decision results of the plurality of decision models to generate a decision, wherein an error rate of the decision is less than individual error rates of the decision results.

9. The non-transitory, computer-readable storage medium of claim 8, wherein to perform a hashing technique, the program instructions when executed on the one or more computers cause the one or more computers to:
for a given feature in the input record:
hash the feature using a hash function associated with a decision model to obtain an index in the feature vector; and
modify the feature vector at the index to reflect the feature.

10. The non-transitory, computer-readable storage medium of claim 8, wherein to perform the hashing techniques, the program instructions when executed on the one or more computers cause the one or more computers to:
perform a first hashing technique to produce a first feature vector for a first decision model; and
perform a second hashing technique to produce a second feature vector for a second decision model, wherein the first and second feature vectors reflect different sets of features of the input record.

11. The non-transitory, computer-readable storage medium of claim 8, wherein:
the input record comprises a document,
the features indicate a presence of words or phrases in the document, and
to generate the decision, the program instructions when executed on the one or more computers cause the one or more computers to generate a classification of the document.

12. The non-transitory, computer-readable storage medium of claim 8, wherein to generate a decision result by a given decision model of the plurality of decision models, the program instructions when executed on the one or more computers cause the one or more computers to generate the decision result based on a decision tree.

13. The non-transitory, computer-readable storage medium of claim 8, wherein to combine the decision results of the decision models, the program instructions when executed on the one or more computers cause the one or more computers to conduct a vote of the decision models.

14. The non-transitory, computer-readable storage medium of claim 8, wherein to combine the decision results of the decision models, the program instructions when executed on the one or more computers cause the one or more computers to perform an averaging of the decision results.

15. A method, comprising:
training a plurality of decision models in parallel using a machine learning technique and a training data set, including:
performing a plurality of hashing techniques to reduce an input record in the training data set to a plurality of feature vectors, wherein the feature vectors are sized to fit in units of a cache to be accessed in parallel using a single instruction multiple data (SIMD) operation, wherein individual ones of the feature vectors are generated based on a hash of individual features of the input record modulo a vector size, and wherein the vector size is selected based on a size of the units of the cache;

providing individual ones of the feature vectors to respective ones of the decision models to train the decision models in parallel, wherein the feature vectors are accessed from the cache in parallel using the SIMD operation; and determining that each decision model is trained to achieve an individual error rate; and combining the plurality of decision models into an ensembled decision model, including:

configuring the ensembled decision model to generate a decision based at least in part on decision results of the plurality of decision models; and determining that the ensembled decision model achieves an overall error rate that is less than all individual error rates of the plurality of decision models.

16. The method of claim 15, wherein performing a hashing technique comprises:

determining a feature from the input record;

hashing the feature using a hash function to obtain an index in the feature vector; and modifying the feature vector at the index to reflect the feature.

17. The method of claim 15, wherein performing the hashing techniques comprises:

hashing a first set of features from a particular input record to produce a first feature vector for a first decision model; and hashing a second set of features from the particular input record to produce a second feature vector for a second decision model, wherein the first and second sets of features include different features of the particular input record.

18. The method of claim 15, further comprising:

prior to the training of the decision models, determining a number of the decision models to use in the ensembled decision model based at least in part on a performance requirement of the ensembled decision model and an amount of computing resources available to perform the training.

19. The method of claim 15, further comprising:

prior to the training of the decision models, determining a hashing technique for a given decision model based at least in part on a memory or storage capacity of one or more computers to be used to train the given decision model.

20. The method of claim 15, wherein training the plurality of decision models comprises selecting different subsamples of a training data set to train each decision model.

21. The method of claim 15, further comprising:

after the training of the decision models, training the ensembled decision model using another machine learning technique to achieve the overall error rate.

* * * * *

UNITED STATES PATENT AND TRADEMARK OFFICE
CERTIFICATE OF CORRECTION

| | |
|---|---|
| PATENT NO. | : 11,263,541 B2 |
| APPLICATION NO. | : 15/717830 |
| DATED | : March 1, 2022 |
| INVENTOR(S) | : Tristan et al. |

It is certified that error appears in the above-identified patent and that said Letters Patent is hereby corrected as shown below:

In the Specification

In Column 9, Line 6, delete "to to" and insert -- to --, therefor.

In Column 9, Line 7, delete "murmurhashv3" and insert -- murmurhash3 --, therefor.

In Column 11, Line 6, delete "the of" and insert -- of the --, therefor.

In the Claims

In Column 21, Line 65, in Claim 8, delete "based the" and insert -- based on the --, therefor.

Signed and Sealed this
Eighteenth Day of October, 2022

Katherine Kelly Vidal
*Director of the United States Patent and Trademark Office*